A. L. BROGDEN.
DIRIGIBLE HEADLIGHT.
APPLICATION FILED OCT. 26, 1921.
1,422,025.
Patented July 4, 1922.
2 SHEETS—SHEET 1.
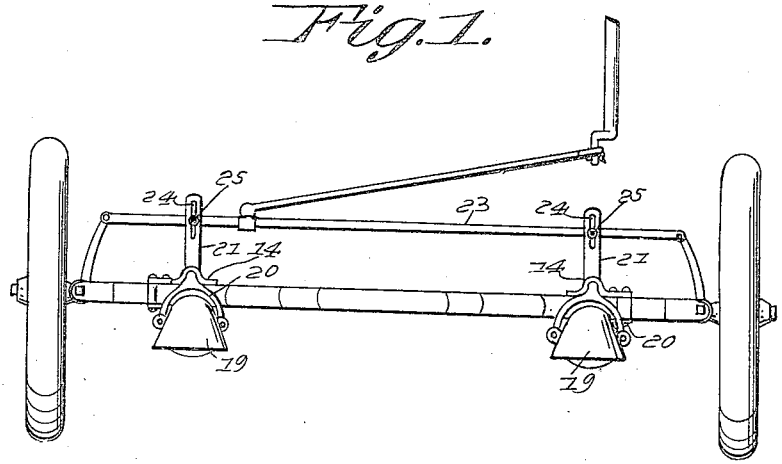
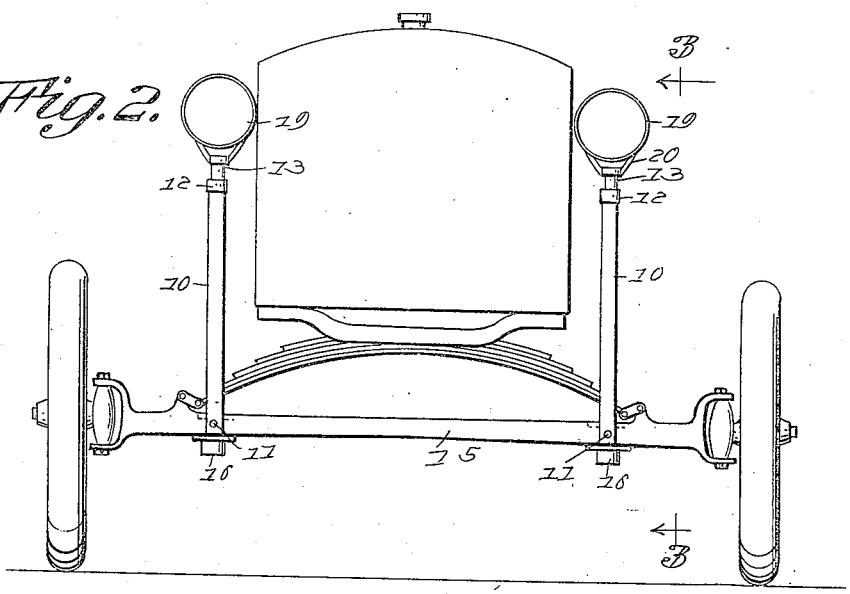
Inventor
A. L. Brogden,
By
Attorney

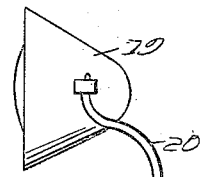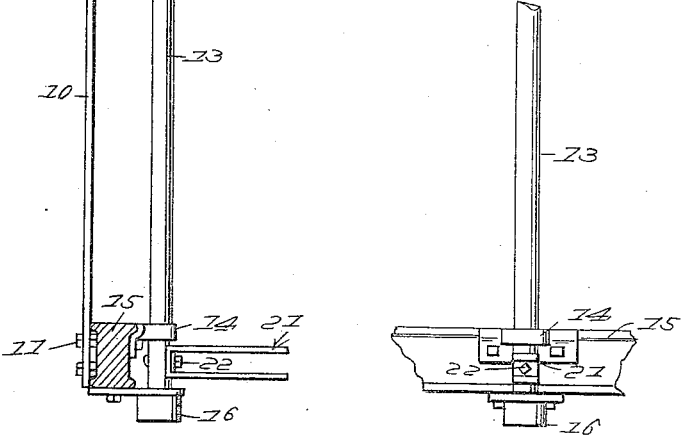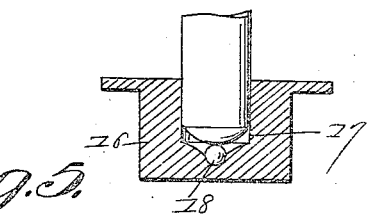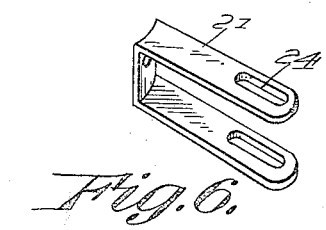

UNITED STATES PATENT OFFICE.

ALVEY L. BROGDEN, OF ABBEVILLE, SOUTH CAROLINA.

DIRIGIBLE HEADLIGHT.

1,422,025.  Specification of Letters Patent.  Patented July 4, 1922.

Application filed October 26, 1921. Serial No. 510,426.

*To all whom it may concern:*

Be it known that ALVEY L. BROGDEN, a citizen of the United States of America, residing at Abbeville, in the county of Abbeville and State of South Carolina, has invented new and useful Improvements in Dirigible Headlights, of which the following is a specification.

The object of the invention is to provide a simple and efficient dirigible headlight for automobiles and similar vehicles and more particularly to provide a device for this purpose which may be readily applied as an attachment to an automobile of any of the conventional forms without necessitating any substantial or material alteration in or rearrangement of the same; and with this object in view the invention consists in a construction and combination of parts of which a preferred embodiment is shown in the accompanying drawings, wherein:—

Figure 1 is a plan view of the headlight shown in operative relation with the front portion of a vehicle of the automobile type.

Figure 2 is a front view of the same.

Figure 3 is a side view of the attachment viewed as indicated by the lines 3—3 of Figure 2.

Figure 4 is a rear view of the lower portion of the structure illustrated in Figure 3.

Figure 5 is a detail sectional view of the bearing for the lamp posts.

Figure 6 is a similar view of one of the operating arms.

The apparatus consists essentially of a standard 10, one for each headlight which is adapted to be attached at its lower end by bolts 11 with the front axle of the vehicle to support a bearing sleeve 12 in which is mounted a lamp post 13 fitted near its lower end in a bearing sleeve 14 also carried by the front axle which is shown at 15 and fitted at its lower end in a step bearing 16 carried by the axle, said step bearing preferably being of the anti-friction or ball type as indicated in detail in Figure 5 wherein the lower end of the post is spherically rounded as shown at 17 for engagement with a bearing ball 18, to the end that the frictional resistance in turning the post may be minimized. The lamp 19 may be supported upon the upper end of the post in any suitable or preferred manner as by means of the bracket 20.

Extending rearwardly from the post 13 is an operating arm 21 consisting of parallel leaves or elements spaced apart vertically and preferably formed of a looped blank bolted at its closed end as shown at 22 to the lamp post between the bearing sleeve 14 and the step bearing 16 so as to serve as a means of preventing the displacement of the lamp post from its bearings by reason of jars or vibration of the machine. The elements of the operating arm are arranged to straddle the steering bar 23 and are preferably slotted as shown at 24 for engagement with guide pins 25 so that as the steering bar is moved in the operation of steering the machine a corresponding swinging motion is transmitted to the operating arms and through the same to the posts to dispose the lamps to direct rays of light in the path of the machine as defined by the deflection of the front wheels thereof.

Having described the invention, what is claimed as new and useful is:—

1. A dirigible headlight attachment for automobiles having standards and means for attaching the same at their lower ends to the front axle of the vehicle and provided at their upper ends with bearing sleeves, bearings for registration with said bearing sleeves having means for attachment to the front axle, lamp carrying posts mounted revolubly in said bearing sleeves and bearings, and means for communicating motion from the steering bar of the vehicle to said posts and consisting of operating arms carried by the posts and terminally actuable by said steering bar, the bearings for the lower end of each post consisting of a bearing sleeve and a step bearing, and said operating arm being extended from the post between the same.

2. A dirigible headlight attachment for automobiles having standards and means for attaching the same to the front axle of the vehicle and provided at their upper ends with bearing sleeves, bearings for registration with said bearing sleeves and having means for attachment to the front axle, lamp carrying posts revolubly mounted in said bearing sleeves and bearings, means for communicating motion from the steering bar of the vehicle to said posts, and step bearings for the lower ends of the posts and provided with means for attachment to the vehicle axle.

In testimony whereof he affixes his signature.

ALVEY L. BROGDEN.